(12) United States Patent
Fontaine et al.

(10) Patent No.: US 9,664,850 B2
(45) Date of Patent: May 30, 2017

(54) OPTICAL SPATIAL MODE-MULTIPLEXER

(71) Applicant: Alcatel-Lucent USA Inc., Murray Hill, NJ (US)

(72) Inventors: Nicolas K. Fontaine, Keyport, NJ (US); Roland Ryf, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/584,035

(22) Filed: Dec. 29, 2014

(65) Prior Publication Data

US 2016/0085024 A1    Mar. 24, 2016

Related U.S. Application Data

(60) Provisional application No. 62/053,217, filed on Sep. 21, 2014.

(51) Int. Cl.
| | | |
|---|---|---|
| *H04B 10/00* | (2013.01) | |
| *G02B 6/04* | (2006.01) | |
| *H04J 14/04* | (2006.01) | |
| *G02B 6/293* | (2006.01) | |
| *G02B 6/028* | (2006.01) | |

(52) U.S. Cl.
CPC ............. *G02B 6/04* (2013.01); *G02B 6/2938* (2013.01); *H04J 14/04* (2013.01); *G02B 6/0288* (2013.01)

(58) Field of Classification Search
USPC ...................................... 398/82–88, 140–143
See application file for complete search history.

(56) References Cited

U.S. PATENT DOCUMENTS

| | | | | |
|---|---|---|---|---|
| 5,864,644 A | * | 1/1999 | DiGiovanni | G02B 6/2856 385/43 |
| 7,272,956 B1 | * | 9/2007 | Anikitchev | G02B 6/2835 385/115 |
| 7,305,166 B1 | | 12/2007 | Higby et al. | |
| 7,327,920 B2 | * | 2/2008 | Dong | G02B 6/2551 385/115 |
| 7,379,648 B1 | * | 5/2008 | Brooks | C03B 37/10 385/126 |
| 7,386,211 B1 | * | 6/2008 | Di Teodoro | C03B 37/10 385/126 |
| 7,409,128 B2 | * | 8/2008 | Holcomb | H01S 3/094003 372/6 |
| 7,492,993 B2 | * | 2/2009 | Nakai | G02B 6/2835 385/15 |

(Continued)

OTHER PUBLICATIONS

Leon-Saval, S. G. et al., "Multimode fiber devices with single-mode performance", Optics Letters, vol. 30, No. 19, Oct. 1, 2005, pp. 2545-2547.

(Continued)

*Primary Examiner* — Agustin Bello
(74) *Attorney, Agent, or Firm* — John F. McCabe

(57) ABSTRACT

An apparatus includes an optical fiber bundle that includes a plurality of input optical fibers and a tapered segment. One end of each of the input optical fibers physically connects to a wide end of the tapered segment. The optical fiber bundle is an integral unit. The input optical fibers are multimode optical fibers. Fundamental optical propagating modes of at least two of the multimode optical fibers have different velocities.

17 Claims, 8 Drawing Sheets

(56) References Cited

U.S. PATENT DOCUMENTS

| | | | | |
|---|---|---|---|---|
| 7,787,733 | B2* | 8/2010 | DiGiovanni | G02B 6/0365 385/126 |
| 7,840,107 | B2* | 11/2010 | Tanigawa | G02B 6/02042 359/341.32 |
| 8,503,845 | B2* | 8/2013 | Winzer | G02B 6/02042 385/122 |
| 8,514,485 | B2* | 8/2013 | Rothenberg | G02B 6/02042 359/341.1 |
| 8,693,088 | B2* | 4/2014 | Fini | G02B 6/2835 359/334 |
| 8,725,001 | B2* | 5/2014 | Fini | G02B 6/02042 398/142 |
| 8,761,211 | B2* | 6/2014 | Fermann | H01S 3/067 359/341.3 |
| 8,767,286 | B2* | 7/2014 | Savage-Leuchs | G02B 6/02009 359/341.1 |
| 8,767,790 | B2* | 7/2014 | Sipes, Jr. | G02B 6/4296 359/618 |
| 8,774,579 | B2* | 7/2014 | Benjamin | G02B 6/322 385/33 |
| 8,830,566 | B2* | 9/2014 | Rothenberg | H01S 3/06754 359/341.1 |
| 8,922,881 | B2* | 12/2014 | Rothenberg | G02B 6/02042 359/341.1 |
| 8,958,145 | B2* | 2/2015 | Rothenberg | G02B 6/02042 359/341.1 |
| 9,025,239 | B2* | 5/2015 | Zhu | H01S 3/06737 359/341.1 |
| 9,063,289 | B1* | 6/2015 | Farmer | G02B 6/28 |
| 9,088,129 | B2* | 7/2015 | Kashiwagi | H01S 3/06791 |
| 2002/0054740 | A1* | 5/2002 | Vakili | G02B 6/14 385/115 |
| 2005/0207455 | A1* | 9/2005 | MacCormack | H01S 3/094003 372/6 |
| 2007/0003196 | A1* | 1/2007 | Holcomb | H01S 3/094003 385/115 |
| 2008/0170823 | A1* | 7/2008 | Gonthier | G02B 6/2804 385/43 |
| 2008/0180787 | A1* | 7/2008 | DiGiovanni | G02B 6/02019 359/334 |
| 2009/0067795 | A1* | 3/2009 | DiGiovanni | G02B 6/0365 385/128 |
| 2010/0111118 | A1* | 5/2010 | Seo | G02B 6/2804 372/6 |
| 2010/0195678 | A1* | 8/2010 | Kuka | H01S 3/06708 372/6 |
| 2010/0278486 | A1* | 11/2010 | Holland | G02B 6/262 385/43 |
| 2011/0142402 | A1* | 6/2011 | Tachikura | G02B 6/2551 385/96 |
| 2011/0249321 | A1* | 10/2011 | Savage-Leuchs | G02B 6/02009 359/341.3 |
| 2011/0274435 | A1* | 11/2011 | Fini | G02B 6/02042 398/139 |
| 2012/0057220 | A1* | 3/2012 | Langseth | H01S 3/0675 359/341.3 |
| 2013/0156393 | A1* | 6/2013 | Kokubun | G02B 6/02042 385/126 |
| 2013/0243377 | A1* | 9/2013 | Seo | G02B 6/2821 385/37 |
| 2014/0153922 | A1 | 6/2014 | Ryf et al. | |
| 2014/0168756 | A1* | 6/2014 | Zhu | H01S 3/06754 359/341.5 |
| 2015/0049983 | A1* | 2/2015 | Fisher | B32B 37/12 385/29 |
| 2016/0085024 | A1* | 3/2016 | Fontaine | G02B 6/04 398/65 |

OTHER PUBLICATIONS

Fontaine, Nicolas K. et al., "Geometric requirements for photonic lanterns in space division multiplexing", Optics Express, vol. 20, No. 24, Nov. 19, 2012, pp. 27123-27132.

Ryf, R. et al., "Photonic-Lantern-Based Mode Multiplexers for Few-Mode-Fiber Transmission", Optical Fiber Conference (OFC), paper W4J.2, Mar. 2014, 3 pgs.

Ryf, R. et al., "32-bit/s/Hz Spectral Efficiency WDM Transmission over 177-km Few-Mode Fiber", Optical Fiber Conference (OFC), paper PDP5A.1, 2013, 3 pgs.

Fontaine, Nicolas K. et al, "Mode-Selective Dissimilar Fiber Photonic-Lantern Spatial Multiplexers for Few-Mode Fiber", European Conference on Optical Communications (ECOC), PDP1, 2013, 3 pgs.

Leon-Saval, S. G. et al., "Mode-selective photonic lanterns for space-division multiplexing", Optics Express, vol. 22, No. 1, Jan. 13, 2014, pp. 1-9.

Yerolatsitis, S. et al., "Adiabatically-tapered fiber mode multiplexers", Optics Express, vol. 22, No. 1, Jan. 13, 2014, pp. 608-617.

Fontaine, N. K. et al., "Characterization of Space-Division Multiplexing Systems using a Swept-Wavelength Interferometer", Optical Fiber Conference (OFC), paper OW1K.2, 2013, 3 pgs.

Fontaine, N. K. et al., "Characterization of Mode-Dependent Loss of Laser Inscribed Photonic Lanterns for Space Division Multiplexing Systems", Optoelectronics and Communications Conference (OECC), paper MR2.2, 2013, 2 pgs.

Ryf, R. et al., "Wavelength-Selective Switch for Few-Mode Fiber Transmission", European Conference on Optical Communications (ECOC), paper PD1.c.4, (2013), 3 pgs.

Neilson, D. T. et al., U.S. Appl. No. 13/851,371, filed Mar. 27, 2013, 38 pgs.

Fontaine, N. K. et al., U.S. Appl. No. 14/033,033, filed Sep. 20, 2013, 26 pgs.

Essiambre, R-J. et al, U.S. Appl. No. 13/539,371, filed Jun. 30, 2012, 30 pgs.

Ryf, R. et al., U.S. Appl. No. 13/632,038, filed Sep. 30, 2012, 31 pgs.

Ryf, R. et al., U.S. Appl. No. 61/692,735, filed Aug. 24, 2012, 29 pgs.

* cited by examiner

```
┌─────────────────────────────────────────────────────┐ ⎯ 22
│  ARRANGE SEGMENTS OF INITIAL MULTI-MODE OPTICAL     │
│  FIBERS IN A GLASS TUBE TO FORM A PRESELECTED       │
│  CROSS-SECTIONAL PATTERN THEREIN                    │
└─────────────────────────────────────────────────────┘
                          │
┌─────────────────────────────────────────────────────┐ ⎯ 24
│  HEAT THE GLASS TUBE AND THE SEGMENTS OF MULTI-MODE │
│  OPTICAL FIBERS IN THE GLASS TUBE TO SUBSTANTIALLY  │
│  SOFTEN OR MELT THE SEGMENTS AND THE GLASS TUBE     │
└─────────────────────────────────────────────────────┘
                          │
┌─────────────────────────────────────────────────────┐ ⎯ 26
│  TOGETHER PULL THE GLASS TUBE AND THE SEGMENTS OF   │
│  THE MULTI-MODE OPTICAL FIBERS WHILE SOFTENED OR    │
│  MELTED TO FORM A TAPERED SEGMENT AND THEN,         │
│  ALLOW THE TAPERED SEGMENT TO COOL AND HARDEN       │
└─────────────────────────────────────────────────────┘
                          │
┌─────────────────────────────────────────────────────┐ ⎯ 28
│  OPTICALLY CLEAVE THE NARROWER END OF THE           │
│  TAPERED SEGMENT TO PRODUCE A FLATE END FACE        │
└─────────────────────────────────────────────────────┘
```

OPTICAL SPATIAL MODE-MULTIPLEXER

This application claims the benefit of U.S. Provisional Application No. 62/053,217, which was filed on Sep. 21, 2014.

BACKGROUND

Technical Field

This invention relates generally to optical multiplexers and methods and apparatus that use optical multiplexers.

Description of Related Art

This section introduces aspects that may facilitate a better understanding of the inventions. Accordingly, the statements of this section are to be understood in this light and are not to be understood as admissions about what is prior art or what is not prior art.

In recent years, optical spatial mode-multiplexing has been studied as a method for providing optical communications. In optical spatial mode-multiplexing, a set of orthonormal optical propagating modes of a multi-mode optical fiber carry data between an optical transmitter and an optical receiver. The set includes optical propagating modes with nontrivially different lateral intensity and/or phase profiles. Since such different optical propagating modes may carry different data streams, this method of optical communication, which uses a multi-mode optical fiber, has a potential to provide higher data communication rates than methods of optical communication, which use a single mode optical fiber. Thus, optical spatial mode-multiplexing has a potential to solve a data crisis, which may occur due to the growing demand for the optical transmission of data at higher rates.

SUMMARY OF SOME EXEMPLARY EMBODIMENTS

Some embodiments provide optical fiber bundles capable of providing optical spatial-mode multiplexing and optical spatial-mode de-multiplexing, e.g., with low optical losses.

In one embodiment, an apparatus includes an optical fiber bundle that includes a plurality of input optical fibers and a tapered segment. One end of each of the input optical fibers physically connects to a wide end of the tapered segment. The optical fiber bundle is an integral unit. The input optical fibers are multimode optical fibers. Fundamental optical propagating modes of at least two of the multimode optical fibers have different velocities.

In some embodiments of the above apparatus, extensions of the input optical fibers in the tapered segment may taper in diameter along the tapered segment. The distances between the extensions may decrease at distances farther from the wide end.

In some embodiments of any of the above apparatus, distances between extensions of the input optical fibers in the tapered segment decrease at distances farther from the wide end.

In some embodiments of any of the above apparatus, the plurality of input optical fibers includes multimode optical fibers with optical cores of, at least, two different diameters.

In some embodiments, any of the above apparatus may further include a multimode optical fiber whose end face end-couples to a nearby narrower end of the tapered segment.

In some embodiments, any of the above apparatus may further include an optical transmitter having an array of optical data modulators. Optical outputs of the optical data modulators are optically connected to the input optical fibers.

In some embodiments, any of the above apparatus may further include an optical receiver having an array of optical data demodulators. Optical inputs of the optical data demodulators are connected to the input optical fibers.

In some embodiments, any of the apparatus may further include an optical device having first and second Mx1 optical spatial mode multiplexers and M optical processing units. Each optical processing unit optically couples a corresponding optical input of one of the Mx1 optical spatial mode multiplexers and a corresponding optical input of the other of the Mx1 optical spatial mode multiplexers. One of the Mx1 optical spatial mode multiplexers includes the optical fiber bundle. In some such embodiments, some of the optical processing units are configured to correct for differential group delay between different optical spatial modes of a multi-mode optical fiber.

In some embodiments of any of the above apparatus, one or more of the input optical fibers may have an optical core with a radially graded refractive index profile.

BRIEF DESCRIPTION OF THE SEVERAL VIEWS OF THE DRAWINGS

FIG. 2 is a flow chart schematically illustrating a method for making an optical fiber bundle, e.g., the optical fiber bundle of FIG. 1;

In the Figures and text like reference numbers indicate functionally and/or structurally similar elements.

In the Figures, the relative dimensions of some features may be exaggerated to more clearly illustrate apparatus therein.

Herein, various embodiments are described more fully by the Figures and the Detailed Description of Illustrative Embodiments. Nevertheless, the inventions may be embodied in various forms and are not limited to the specific embodiments illustrated in the Figures and/or described in the Detailed Description of the Illustrative Embodiments.

DESCRIPTION OF THE ILLUSTRATIVE EMBODIMENTS

Herein, an optical fiber has an approximately axially symmetric optical core and is configured to carry light in the optical telecommunication C, L and/or S wavelength bands. Optical fibers may be constructed, e.g., with doped and/or undoped silica glass optical cores and optical claddings and may have, e.g., a step-index construction or a graded-index construction. Some optical fibers may have single or multiple steps in their radial refractive-index profile, e.g., as in depressed-cladding-index optical fibers.

Herein, a multi-mode optical fiber (MMF) has a set of relatively orthonormal optical propagation modes with different lateral intensity and/or lateral phase profiles. Two such relatively orthogonal optical propagating modes will typically have different angular momentum eigenvalues or axial radial eigenvalues. In an optical fiber, a lateral direction is perpendicular to a propagation direction in an optical fiber.

Herein, optical propagating modes with different lateral intensity and/or different lateral phase profiles will sometimes be referred to as different optical spatial modes. An optical spatial mode may have two different polarization types, i.e., two relatively orthogonal optical propagating modes whose polarizations are orthogonal.

Herein, a MMF may have a single optical core or multiple optical cores. The term multi-mode optical fiber includes few mode optical fibers (FMFs), which typically have 2 to about 15 different types of optical spatial modes, and also includes multi-mode optical fibers having more different optical spatial modes.

Figure 1:
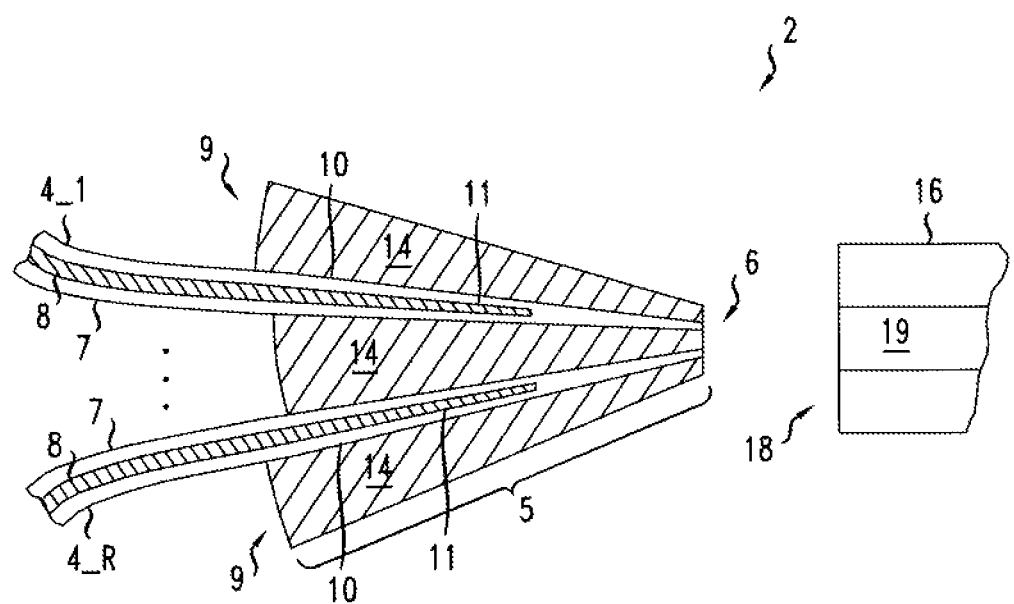
FIG. 1 is a side-view schematically illustrating an optical fiber bundle, e.g., useable as an optical spatial mode-multiplexer.

FIG. 1 schematically illustrates an optical fiber bundle 2, which may be used, e.g., for optical spatial mode-multiplexing and/or optical spatial mode-demultiplexing. The optical fiber bundle 2 includes R input optical fibers 4_1, . . . , 4_R, a tapered segment 5, and an output end face 6, e.g., a flat end face or a curved end face. Here, R is an integer greater than one.

One or more of the input optical fibers 4_1-4_R support different types of optical spatial modes, i.e., are multi-mode optical fibers. Indeed, all of the optical input fibers 4_1-4_R may be multi-mode optical fibers.

Each input optical fiber 4_1-4_R has an optical cladding 7 and an optical core 8. In some embodiments, the input optical fibers 4_1-4_R may have optical cores 8 with radially graded, refractive index profiles.

At least, two of the input optical fibers 4_1-4_R have different longitudinal optical guiding properties. The fundamental optical propagating modes of these, at least, two of the input optical fibers 4_1-4_R have different propagating velocities. The fundamental optical propagating mode has a vanishing angular eigenvalue and the lowest number of radial intensity nodes. For example, these at least, two or more input optical fibers 4_1-4_R may have optical claddings 7 and/or optical cores 8 with different refractive indexes, may have different radial refractive index profiles and/or may have optical cores 8 of different diameters.

One end of each input optical fiber 4_1-4_R ends at the wide end 9 of the tapered segment 5. Nevertheless, each input optical fiber 4_1-4_R has a continuous and smooth light-guiding extension 10 into the tapered segment 5. Each such extension 10 also includes a continuous and smooth extension 11 of the optical core 8 of the corresponding input optical fiber 4_1-4_R. Nevertheless, in some embodiments, the extensions 11 of the optical cores 8 of the input optical fibers 4_1-4_R are absent from a segment of the narrow end of the tapered segment 5.

Another end of each input optical fiber 4_1-4_R may be, e.g., movable separately from the other one or more input optical fibers 4_1-4_R. Thus, these other ends may function, e.g., as R separately movable fiber tails of the optical fiber bundle 2.

In the tapered segment 5, the extensions 10 of the input optical fibers 4_1-4_R are surrounded by a continuous optical cladding 14. Thus, the optical fiber bundle 2 is an integral fiber device. Indeed, removal one of the input optical fibers 4_1-4_R would require cutting the one of the input optical fibers 4_1-4_R or cutting a portion of the tapered segment 5.

In the tapered segment 5, the extensions 10 typically narrow and become closer together, in a relatively smooth manner, as distance increases from the wide end 9 of the tapered segment 5. For these reasons, light, which is initially separately guided by the extensions 10 of different ones of the input optical fibers 4_1-4_R near the wide end 9, will gradually mix as said light propagates in the tapered segment 5 from said wide end 9 to the end face 6.

Preferably, the diameters of the extensions 10 and the distances there between change with distance from the wide end 9 so that the light beams received from the multimode optical fibers 4_1-4_R will be adiabatically reshaped and/or mixed in the tapered segment 5. The lateral packing of extensions 10, their sizes, their refractive index profiles, and their relative separations may be preset so that light input to individual ones of or to disjoint groups of the input optical fibers 4_1-4_R will preferentially excite selected optical spatial modes of a preselected multi-mode optical fiber 16 whose end face 18 is facing and near to the end face 6 of the optical fiber bundle 2 and whose optical core 19 is aligned with the end face 6 of the optical fiber bundle 2.

U.S Patent Application Publication No. 2014/0153922 and U.S. patent application Ser. No. 14/033,033, which was filed Sep. 20, 2013, illustrate lateral packing patterns for such extensions of optical fibers in tapered segments of some optical fiber bundles. Based on teachings of the present disclosure, a skilled person may be able to modify some of those lateral packing patterns to produce lateral packing patterns of the optical fibers 4_1-4_R of FIG. 1 in the tapered segment 5 to produce optical spatial mode-multiplexers. The U.S. patent application Publication No. and U.S. patent application, which are identified in this paragraph, are incorporated herein by reference in their entirety.

FIG. 2 illustrates a method 20 for fabricating an optical fiber bundle with an integral tapered segment, e.g., the tapered segment 5 of the optical fiber bundle 2 of FIG. 1. The method 20 uses a set of initial multi-mode optical fibers and a reduced-index glass tube to produce the optical fiber bundle. In the set, at least two of the multi-mode optical fibers have different longitudinal optical guiding properties, i.e., have fundamental optical propagating modes with different velocities. These multi-mode optical fibers may, e.g., have optical cores of different diameters and/or of different refractive indexes. The glass tube has a lower optical refractive index than the optical claddings of the initial multimode optical fibers so that material of the glass tube can function as optical cladding in the tapered segment of the optical fiber bundle, which is produced by the method 20.

The method 20 includes arranging segments, e.g., first end segments, of the initial multi-mode optical fibers in the glass tube such that the segments form a preselected cross-sectional pattern therein (step 22). Preferably, the glass tube has a small enough inner diameter to substantially maintain the preselected cross-sectional pattern in which the segments of the multi-mode optical fibers were initially arranged therein.

Next, the method 20 includes heating the glass tube and the segments of the multi-mode optical fibers in the glass tube to substantially soften or melt both the segments and the glass tube (step 24). Typically, the softening or melting is sufficient so that segments of the multi-mode optical fibers and the glass tube become stretchable and stick together. The softening or melting step 24 can be performed, e.g., using a commercially available laser station for optical fiber pulling and conventional heating for optical fiber pulling.

Next, the method 20 includes pulling the glass tube and the segments of the multi-mode optical fibers together while substantially softened or melted to form the tapered segment of the optical fiber bundle with a desired form and then, allowing the tapered segment to cool and harden (step 26). After the cooling, segments of the initial multi-mode fibers are separated at distal ends thereof and opposite ends of the initial multi-mode optical fibers are smoothly incorporated into the integral tapered segment.

The pulling step 26 may produce a structure, in which the optical cores of the initial multimode optical fibers are absent from a segment of the tapered segment. In the narrow end of said tapered segment, guiding or partially guiding optical cores may be formed, e.g., by the optical cladding of the initial multi-mode optical fibers. At the narrow end of the tapered segment, the optical cladding is typically formed by material of the initial glass tube.

It may be preferable to perform the pulling step 26 such that velocities of the fundamental optical propagating modes of some or all of the initial multi-mode optical fibers have velocities in the extensions thereof that longitudinally evolve, but do not cross in the tapered segment. For example, in the extensions 10 of those input optical fibers 4_1-4-R whose fundamental propagating modes have different velocities, the velocities of these fundamental guided modes will typically remain different along the tapered segment 5.

The narrow end of the tapered segment, which was produced at the pulling step 26, may optionally be cleaved to produce a clean curved or flat end face, e.g., end face 6 of FIG. 1 (step 28).

EXAMPLE 1

Optical Fiber Bundle with 3 Multimode Input Optical Fibers

In a first example, the method 20 of FIG. 2 is used to form an embodiment of the optical fiber bundle 2 of FIG. 1 with R=3. For this embodiment, the method 20 uses two type A initial multi-mode optical fibers, a single type B initial multi-mode optical fiber, and an initial glass tube of appropriate internal diameter.

In the first example, the type A initial multi-mode optical fibers have graded-index optical cores of diameters of about 15 μm (micro-meters), and the type B initial multi-mode optical fiber has a graded-index optical core of diameter of about 20 μm. Each of the initial multi-mode optical fibers A and B has an optical core whose refractive-index varies in an approximately parabolic manner with radial distance from the axis of the optical core. The radial refractive index profiles have maximal values along the axes of the optical cores, and said maximal values are typically about 1% higher on the axes than at the optical cladding-optical core boundaries. The three initial multi-mode optical fibers A and B have optical claddings with outer diameters of about 125 μm.

In the first example, the initial glass tube 23 is doped to have a lower refractive index than the optical claddings of the initial multi-mode optical fibers A and B. For example the glass tube 23 may be a fused silica tube, which is fluorine doped to have a refractive-index that is about 0.6% lower than the refractive indexes of the optical claddings of the three initial multi-mode optical fibers A and B.

Figure 3A:
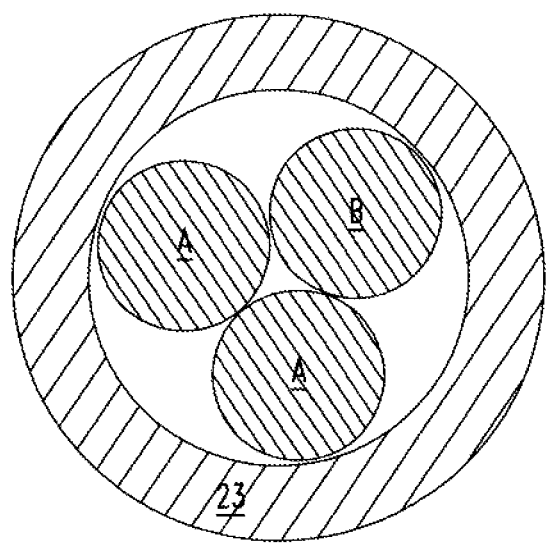
FIG. 3A is a cross-sectional view of a pattern of segments of three multi-mode optical fibers in a glass tube that the method of FIG. 2 may process to form a tapered segment of an optical fiber bundle, e.g., the tapered segment illustrated in FIG. 1.

In the first example, the arranging step 22 of the method 20 produces a cross-sectional pattern of end segments of type A and B multi-mode optical fibers, in the glass tube 23, as schematically illustrated in FIG. 3A.

In the first example, the pulling step 26 of the method 20 may produce a tapered segment, i.e., tapered segment 5 of FIG. 1, whose width and/or optical core width is about 8.5 times smaller at its narrow end than at its wide end. For end-coupling the end-face of the tapered segment to an output multi-mode optical fiber having a parabolic graded-index optical core, an optical core diameter of about 50 μm, and an optical core-cladding delta of about 1%, the produced tapered segment may have a narrow end with a total diameter or an optical core diameter of about 28 μm. Such an end face diameter can approximately match the mode area of the above output multi-mode optical fiber.

In the first example, the pulling step 26 of the method 20 may produce the tapered segment to be quite short, e.g., 5 centimeters (cm) or less and even as short as 2 cm. Such a short tapered segment can be advantageous in various applications of the optical fiber bundle as an optical spatial mode-multiplexer SM-MUX. Such a short tapered segment may not generate high optical losses when the initial optical fibers are graded index, multi-mode optical fibers.

In this first example, the produced optical fiber bundle or photonic lantern can provide a strong mode-coupling selectivity between the different optical input ports and can provide low optical losses. In particular, the input optical fibers of type A with an optical core diameter of about 15 μm can selectively primarily send light to $LP_{11}$ modes of the above-described output multi-mode optical fiber when that fiber's end face is adjacent and near to the end face of the narrow end of the tapered segment of the optical fiber bundle and aligned there over. In addition, the input optical fiber of type B with an optical core diameter of about 20 μm can selectively primarily send light to the $LP_{01}$ mode of the output multi-mode optical fiber when that fiber's end face is adjacent and near to the end face of the narrower end of the tapered segment of the optical fiber bundle and aligned there over.

EXAMPLE 2

Optical Fiber Bundle with 6 Multimode Input Optical Fibers

In a second example, the method 20 of FIG. 2 may be used to form an embodiment of the optical fiber bundle 2 of FIG. 1 with R=6. For this embodiment, the method 20 uses types A, B, and C of initial multi-mode optical fibers and a glass tube of appropriate internal diameter. In particular, the method 20 uses three type A initial multi-mode optical fibers having graded-index optical cores of diameters of about 15 μm, two type B initial multi-mode optical fibers having graded-index optical cores of diameters of about 20 μm, and one type C initial multi-mode optical fiber having a graded-index optical core of diameter of about 22 μm.

Figure 3B:
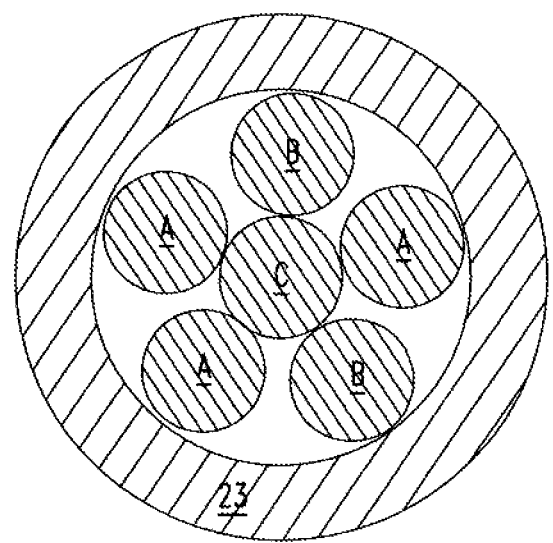
FIG. 3B is a cross-sectional view of a pattern of segments of six multi-mode optical fibers in a glass tube that the method of FIG. 2 may process to form a tapered segment of an optical fiber bundle, e.g., the tapered segment illustrated in FIG. 1.

In the second example, the arranging step 22 of the method 20 produces a cross-sectional pattern of the segments of type A, B, and C multi-mode optical fibers in the glass tube 23 as schematically illustrated in FIG. 3B. The extensions 10 of the input optical fibers 4_1-4_R of types A, B, and C form a similar pattern in the taper segment 5 of FIG. 1 after performance of the pulling step 26 of the method 20. The pulling step 26 may be performed such that the optical cores are absent from the narrow end of the tapered segment.

In the second example, each of the initial multi-mode optical fibers A, B, and C has an optical core whose refractive-index has an approximately parabolic dependence on radial distance from the axis of the optical core. The radial refractive index profiles have maximal values along the axes of the optical cores and are typically about 1% higher on the axes than at the optical cladding-optical core boundaries. The initial multi-mode optical fibers A, B, and C have optical claddings with outer diameters of about 125 µm. The glass tube 23 has a lower refractive index than the optical claddings of the initial multi-mode optical fibers A, B, and C. For example the glass tube 23 may be a fused silica tube, which is fluorine doped to have a refractive-index that is about 0.6% lower than the refractive indexes of the optical claddings of the initial multi-mode optical fibers A, B, and C.

In this second example, the pulling step 26 of the method 20 may produce a tapered segment, e.g., the tapered segment 5 of FIG. 1, with a width and/or optical core width about 11.2 times smaller at its narrow end than at its wide end. Also, the tapered segment may be quite short, e.g., 5 centimeters (cm) or less and even as short as 2 cm. Such a short tapered segment can be advantageous in various applications of the photonic lantern as an optical spatial mode-multiplexer or an optical spatial mode-demultiplexer and may not produce large optical losses.

In this second example, the produced optical fiber bundle or photonic lantern can provide a strong mode-coupling selectivity and low optical losses. In particular, the optical input fibers A with optical core diameters of about 15 µm can selectively primarily send light to $LP_{02}$ and $LP_{21}$ modes of the above-described output multi-mode optical fiber when that fiber's end face is adjacent and near to the end face of the narrow end of the optical fiber bundle and aligned there over. In addition, the optical input fibers B whose optical core diameters are about 20 µm can selectively primarily send light to the $LP_{11}$ modes of the same output multi-mode optical fiber when that fiber's end face is adjacent and near to the end face of the narrow end of the optical fiber bundle and aligned there over. Finally, the optical input fiber C whose optical core diameter is about 22 µm can selectively primarily send light to the $LP_{01}$ mode of the same output multi-mode optical fiber when that fiber's end face is adjacent and near to the end face of the narrow end of the optical fiber bundle and aligned there over.

Optical Communication Systems Using Photonic Lanterns

Figure 4:
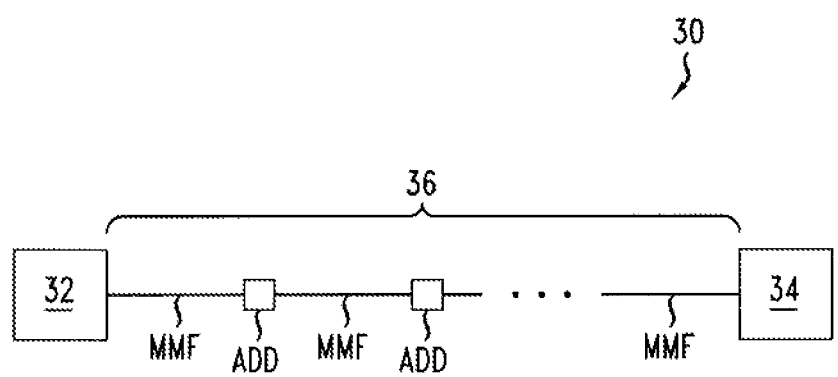
FIG. 4 is a block diagram schematically illustrating an optical communication system that is capable of using optical spatial-mode multiplexing and/or optical spatial-mode de-multiplexing.

FIG. 4 illustrates an optical communication system 30 that includes an optical transmitter 32, an optical receiver 34, and an all-optical multi-mode fiber channel 36. The all-optical multi-mode fiber channel 36 optically connects at a first end to the optical transmitter 32 and at a second end to the optical receiver 34. The all-optical multi-mode fiber channel 36 includes a series of one or more optical transmission spans of multi-mode optical fiber MMF, e.g., spans of the same type of multi-mode optical fiber. In embodiments with more than one such optical transmission span, adjacent ends of successive optical transmission spans of the multi-mode optical fibers MMF are optically connected by an all-optical device AOD. The all-optical device AOD may perform, e.g., optical amplification and/or equalization, differential optical group delay compensation, and/or optical dispersion compensation.

In some embodiments, an optional last all-optical device (not shown) may be used to reduce or remove residual differential group delay between the optical propagating modes and/or to provide optical amplification and/or equalization, and/or reduce or remove residual dispersion of optical propagating modes.

The individual optical transmission span(s) of multi-mode optical fiber MMF and/or all-optical device(s) AOD may be constructed, e.g., as described in U.S. patent application Ser. No. 13/539,371, filed on Jun. 30, 2012. Some of the all-optical processing unit(s) $20_1$-$20_N$ may include multi-mode optical amplifiers, e.g., as described in U.S. patent application Ser. No. 13/632,038, filed Sep. 30, 2012 and/or U.S. provisional patent application No. 61/692,735, filed Aug. 24, 2012. The patent applications recited in this paragraph are incorporated herein by reference in their entirety.

Figure 5:
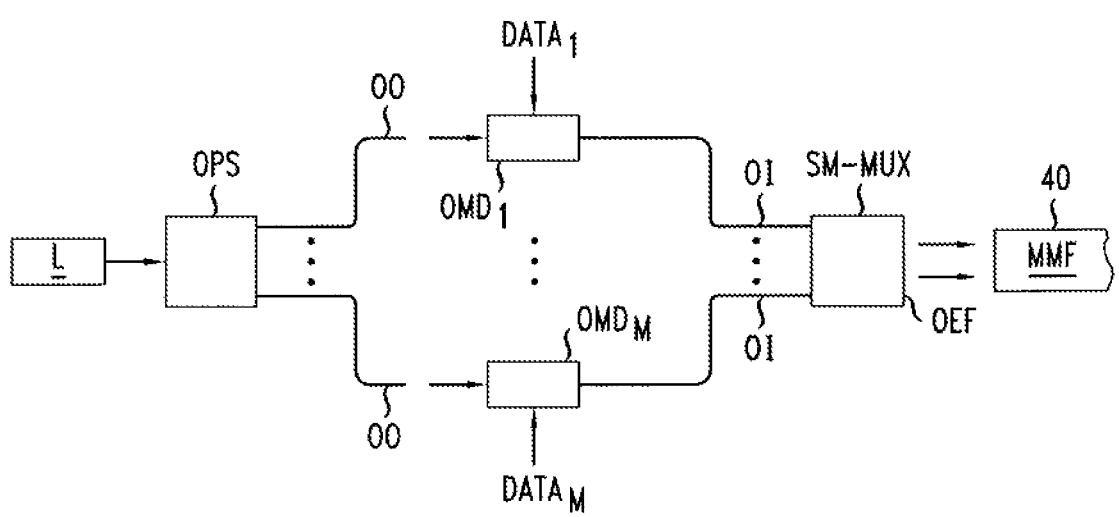
FIG. 5 is a block diagram schematically illustrating the optical transmitter of FIG. 4.

FIG. 5 illustrates the optical transmitter 32 of FIG. 4. The optical transmitter 32 includes a parallel array of M optical data modulators $ODM_1, \ldots, ODM_M$ and an optical spatial mode-multiplexer SM-MUX. The M optical data modulators $ODM_1$-$ODM_M$ may, e.g., receive optical carriers at optical inputs thereof, e.g., from the M optical outputs OO of an optical power splitter OPS connected to receive light from a laser L. At an electrical control input, each optical data modulator $ODM_1$-$ODM_M$ receives a corresponding digital data stream $DATA_1$-$DATA_M$. At a corresponding optical output, each optical data modulator $ODM_1$-$ODM_M$ transmits a phase and/or amplitude modulated optical carrier, wherein the modulation carries the corresponding digital data stream $DATA_1$-$DATA_M$. Each optical output of the optical data modulators $ODM_1$-$ODM_M$ optically connects to one or more optical inputs OI of the optical spatial mode-multiplexer SM-MUX.

Optical paths between the optical outputs of the optical data modulators $ODM_1$-$ODM_M$ and the optical inputs of the optical spatial mode-multiplexer SM-MUX may include free-space or lumped optical devices, optical waveguides, optical fibers and/or other optical couplers, e.g., one or more optical power splitters (not all shown). Each such optical path may also include, e.g., optical elements such as converging and diverging optical lens(es) and/or mirror(s), optical phase plate(s) and/or optical phase-patterned mask(s). Such optical phase plate(s) and/or optical phase-patterned mask(s) may be configured, e.g., to adjust relative phases of light beams at the optical inputs of the optical spatial mode-multiplexer SM-MUX.

An output optical end-face OEF of the optical spatial mode-multiplexer SM-MUX optically couples to an adjacent and nearby end-face 40 of a multi-mode optical fiber MMF, e.g., the first multi-mode optical fiber MMF of the optical multi-mode fiber channel 36 illustrated in FIG. 1. The optical spatial mode-multiplexer SM-MUX may produce light spots on the adjacent and nearby end-face 40 of the a multi-mode optical fiber MMF such that individual ones of the various optical data modulators $ODM_1$-$ODM_M$ predominantly optically excite selected optical propagating modes of the MMF. For example, the optical spatial mode-multiplexer SM-MUX may produce a preset pattern of light spots on the adjacent and nearby end face of the multi-mode optical fiber MMF in response to receiving light in one of or in a group of its optical inputs. For different ones of or different groups of the optical inputs, the preset set pattern of light spots may excite, e.g., relatively orthogonal optical spatial modes of the multi-mode optical fiber MMF.

Figure 6:
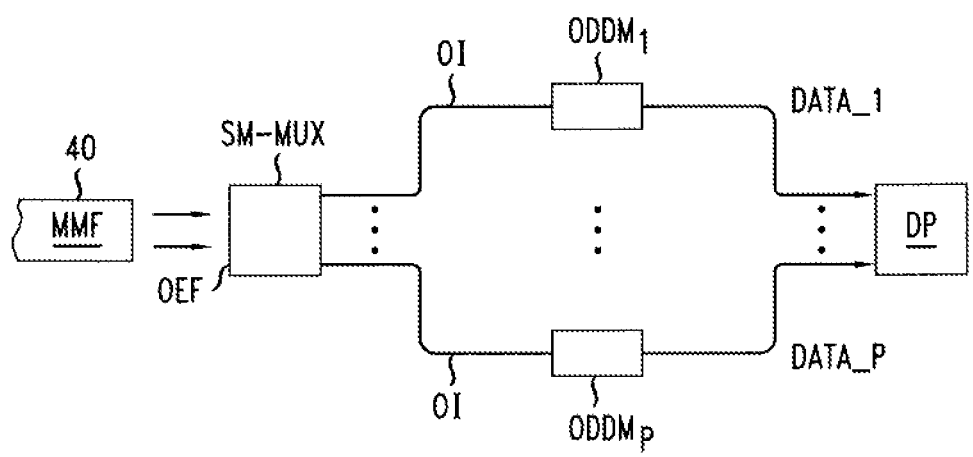
FIG. 6 is a block diagram schematically illustrating the optical receiver of FIG. 4.

FIG. 6 illustrates the optical receiver 34 of FIG. 4. The optical receiver 34 includes an electronic digital data processor DP, a parallel array of P optical data demodulators $ODDM_1, \ldots, ODDM_P$ and an optical spatial mode-multiplexer SM-MUX. The optical data demodulators $ODDM_1$-$ODDM_P$ demodulate digital data streams DATA_1, ..., DATA_P from optical signals received therein and transmit the demodulated digital data streams DATA_1-DATA_P to the electronic digital data processor DP. The optical spatial mode-multiplexer SM-MUX is connected to operate backwards as an optical spatial mode-demultiplexer. In particular, an optical end face OEF of the optical spatial mode-multiplexer SM-MUX is located to receive light from an adjacent and nearby end face 40 of a multi-mode optical fiber MMF, e.g., the last multimode-optical fiber of the optical multi-mode fiber channel 36 of FIG. 4. Other optical ports of the optical spatial mode-multiplexer SM-MUX are connected to transmit portions of the light, which is received at the optical end face OEF, to the P optical data demodulators $ODDM_1$-$ODDM_P$. The other optical ports would be optical inputs if the optical spatial mode-multiplexer SM-MUX was operated as an optical multiplexer. Each of the P optical data demodulators $ODDM_1$-$ODDM_P$ is connected to selectively receive light from one or more these other optical ports of the optical spatial mode-multiplexer SM-MUX.

Optical paths between the P optical inputs OI of the optical data demodulators $ODDM_1$-$ODDM_P$ and the other optical ports of the optical spatial mode-multiplexer SM-MUX may include free-space or lumped optical devices, optical waveguides, optical fibers and/or other optical couplers, e.g., one or more optical power splitters. Each such optical path may also include, e.g., optical elements such as converging and diverging optical lens(es) and/or mirror(s), optical phase plate(s) and/or optical phase-patterned mask(s). Such optical phase plate(s) and/or optical phase-patterned mask(s) may be configured, e.g., to adjust relative phases of light beams, which are receive from the nearby other optical ports of the optical spatial mode-multiplexer SM-MUX.

In the optical receiver 14, the evaluation of the digital data streams DATA_1-DATA_P in the digital data processor DP may involve performing conventional optical and/or electronic MIMO processing and/or equalization of the parallel streams of light values and/or the electronic measurement thereof. In some embodiments, the optical receiver 34 may also optically and/or electronically perform conventional differential group velocity compensation and/or optical amplification and/or equalization prior to and/or after the processing via the optical data demodulators $ODDM_1$-$ODDM_P$. The MIMO processing and/or equalization may, e.g., approximately diagonalize the product of the optical channel matrix for the preselected set of optical propagating modes and the optical coupling matrix of the optical transmitter 32.

In various embodiments, one or more of the optical spatial mode-multiplexers SM-MUX of optical transmitter 32 and/or the optical receiver 34 of FIGS. 4-6 may be or may be based on the optical fiber bundle 2 illustrated FIG. 1. In such optical spatial mode-multiplexers SM-MUX, the optical ports of the optical fiber bundle 2 may, e.g., optically couple to external optical ports of the optical spatial mode-multiplexer SM-MUX via lens(es), mirror(es), and/or optical phase plates.

In some embodiments, the optical transmitter 32 and/or optical receiver 34 may incorporate wavelength-multiplexing.

Figure 7:
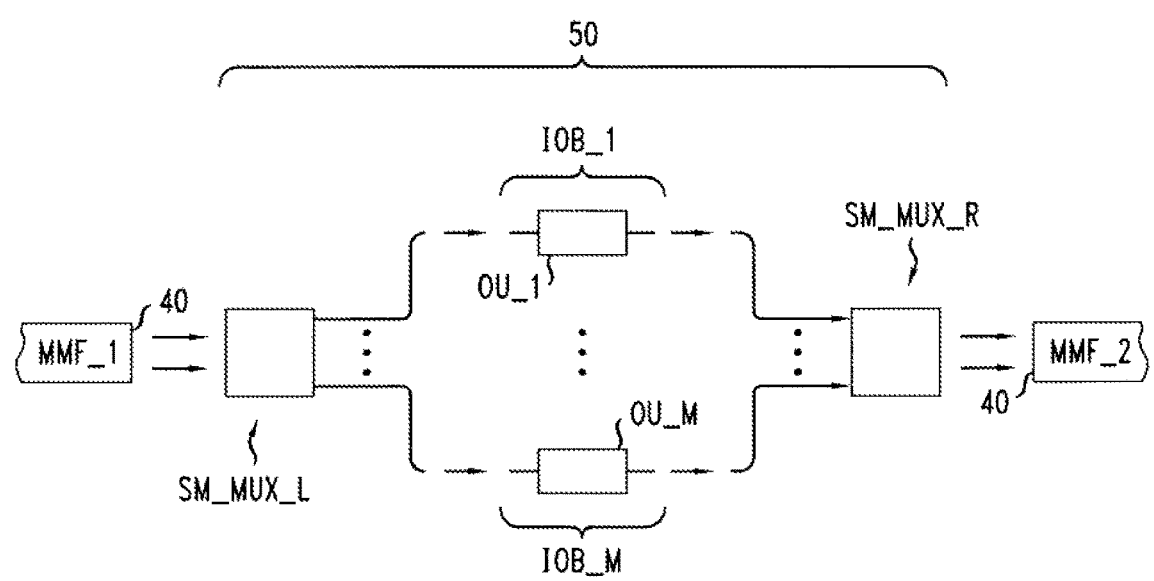
FIG. 7 schematically illustrates an optical apparatus capable of providing optical spatial-mode equalization and/or differential group delay compensation.

FIG. 7 illustrates an optical apparatus 50 configured to separately process optical spatial-modes or to separately process disjoint sets of optical spatial-mode(s). The apparatus 50 includes left and right Mx1 optical spatial mode-multiplexers SM-MUX_L, SM-MUX_R. The left Mx1 optical spatial mode-multiplexer SM_MUX_L optical spatial mode-demultiplexes light, which is received from the adjacent and nearby end face 40 of a first multi-mode optical fiber MMF_1, and optical spatial mode selectively or optical spatial mode-set selectively sends the demultiplexed light to M parallel internal optical branches IOB_1, . . . IOB_M. The right Mx1 optical spatial mode-multiplexer SM-MUX operates in reverse manner to optical spatial mode-multiplex light received from the M parallel internal optical branches OB and to send said optical spatial mode-multiplexed light to the adjacent and nearby end face 40 of a second multi-mode optical fiber MMF_2. The first and second multi-mode optical fibers MMF_1, MMF_2 may be, e.g., consecutive spans of the multi-mode optical fibers MMF of the optical multi-mode fiber channel 36 illustrated in FIG. 4. In such an embodiment, the optical apparatus 50 may be one of or may be included in one of the all-optical devices AOD, which are illustrated in FIG. 4.

Each internal optical branch IOB_1-IOB_M includes an optical unit OU_1, . . . , OU_M for processing the one or more optical spatial modes selectively sent to that internal optical branch IOB_1-IOB_M. For example, the OU_1, . . . , OU_M may include a delay line to compensate for differential group delay and/or an optical attenuator and/or an optical amplifier to compensate for differential optical attenuation. Thus, the optical apparatus 50 is capable of compensating optical signal degradations whose magnitudes vary with optical spatial mode or whose magnitudes vary over disjoint sets of the optical spatial modes.

In the optical apparatus 50, the left and/or right Mx1 optical spatial mode-multiplexers SM-MUX_L, SM-MUX_R may be or may be based on the optical fiber bundle 2 of FIG. 1. In such Mx1 optical spatial mode-multiplexers SM-MUX_L, SM-MUX_R, the optical ports of the optical fiber bundle 2 of FIG. 1 may, e.g., optically connect to external optical ports of the Mx1 optical spatial mode-multiplexers SM-MUX_L, SM-MUX_R via len(es), mirror(es), and/or optical phase plates.

Herein, various passive optical elements are described as input elements, e.g., input optical fibers, or output optical elements, e.g., output optical fibers. It is to be understood that a characterization of such a passive optical element as an input optical element does not exclude embodiments where the optical element is used as an output optical element, because many passive optical elements can be used in a reversed manner. Similarly, it is to be understood that a characterization of such a passive optical element as an output optical element does not exclude embodiments where the optical element is used as an input optical element, because many passive optical elements can be used in a reversed manner.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:
1. An apparatus, comprising:
an optical fiber bundle comprising a plurality of input optical fibers and a tapered segment, one end of each of the input optical fibers physically connecting to a wide end of the tapered segment, the optical fiber bundle being an integral unit; and wherein the input optical fibers are multimode optical fibers;

wherein fundamental optical propagating modes of at least two of the multimode optical fibers have different velocities; and wherein the plurality of input optical fibers includes multi-mode optical fibers with axially symmetric optical cores of, at least, three different diameters.

2. The apparatus of claim 1, one or more of the input optical fibers having an optical core with a radially graded refractive index profile.

3. The apparatus of claim 1, wherein extensions of the input optical fibers in the tapered segment taper in diameter along the tapered segment.

4. The apparatus of claim 3, wherein distances between the extensions decrease at distances farther from the wide end.

5. The apparatus of claim 1, wherein distances between extensions of the input optical fibers in the tapered segment decrease at distances farther from the wide end.

6. The apparatus of claim 3, wherein at least one of the input optical fibers has an optical core with a laterally graded index profile.

7. The apparatus of claim 1, further comprising a multimode optical fiber whose end face is optically end-coupled to a nearby narrower end of the tapered segment.

8. An apparatus, comprising:

an optical fiber bundle comprising a plurality of input optical fibers and a tapered segment, one end of each of the input optical fibers physically connecting to a wide end of the tapered segment, the optical fiber bundle being an integral unit; and wherein the input optical fibers are multimode optical fibers having axially symmetric optical cores;

wherein fundamental optical propagating modes of at least two of the multimode optical fibers have different velocities; and wherein the apparatus further comprises an optical transmitter having an array of optical data modulators, optical outputs of the optical data modulators being optically coupled to the input optical fibers.

9. The apparatus of claim 8, wherein at least one of the input optical fibers has an optical core with a radially graded refractive index profile.

10. An apparatus, comprising:

an optical fiber bundle comprising a plurality of input optical fibers and a tapered segment, one end of each of the input optical fibers physically connecting to a wide end of the tapered segment, the optical fiber bundle being an integral unit; and wherein the input optical fibers are multimode optical fibers having axially symmetric optical cores;

wherein fundamental optical propagating modes of at least two of the multimode optical fibers have different velocities; and wherein the apparatus further comprises an optical receiver having an array of optical data demodulators, optical inputs of the optical data demodulators being optically coupled to the input optical fibers.

11. The apparatus of claim 10, wherein at least one of the input optical fibers has an optical core with a radially graded refractive index profile.

12. An apparatus, comprising:

an optical fiber bundle comprising a plurality of input optical fibers and a tapered segment, one end of each of the input optical fibers physically connecting to a wide end of the tapered segment, the optical fiber bundle being an integral unit; and wherein the input optical fibers are multimode optical fibers having axially symmetric optical cores;

wherein fundamental optical propagating modes of at least two of the multimode optical fibers have different velocities; and wherein the apparatus further comprises an optical device having first and second Mx1 optical spatial mode multiplexers and M optical processing units, each optical processing unit optically coupling a corresponding optical input of one of the Mx1 optical spatial mode multiplexers to a corresponding optical input of the other of the Mx1 optical spatial mode multiplexers, one of the Mx1 optical spatial mode multiplexers including the optical fiber bundle.

13. The apparatus of claim 12, wherein some of the optical processing units are configured to correct for differential group delay between different optical spatial modes.

14. The apparatus of claim 12, wherein at least one of the input optical fibers has an optical core with a radially graded refractive index profile.

15. The apparatus of claim 8, wherein the plurality of input optical fibers includes multi-mode optical fibers with optical cores of, at least, three different diameters.

16. The apparatus of claim 10, wherein the plurality of input optical fibers includes multi-mode optical fibers with optical cores of, at least, three different diameters.

17. The apparatus of claim 12, wherein the plurality of input optical fibers includes multi-mode optical fibers with optical cores of, at least, three different diameters.

* * * * *